(12) United States Patent
Chiang et al.

(10) Patent No.: US 6,403,252 B1
(45) Date of Patent: Jun. 11, 2002

(54) BATTERY PACK FOR ELECTRICAL APPARATUS

(76) Inventors: Cyril C. K. Chiang, 5Fl. No.5, Ln1, Aly24, Jen-Ai Rd., Sec. 3, Taipei (TW); Min Hon Rei, 6512 43rd Av. NE., Seatle, WA (US) 98115

(*) Notice: Subject to any disclaimer, the term of this patent is extended or adjusted under 35 U.S.C. 154(b) by 0 days.

(21) Appl. No.: 09/352,065

(22) Filed: Jul. 14, 1999

(51) Int. Cl.[7] ................................. H01M 2/06
(52) U.S. Cl. ..................... 429/96; 429/152; 429/153
(58) Field of Search ..................... 429/96–100, 162, 429/152, 153

(56) References Cited

U.S. PATENT DOCUMENTS 5,075,182 A * 12/1991 Weber ........................... 429/1
5,728,488 A * 3/1998 Kranz et al. ................. 429/120

* cited by examiner

Primary Examiner—Carol Chaney
(74) Attorney, Agent, or Firm—Michael Best & Friedrich LLC; Laff, Whitesel & Saret, Ltd.; J. Warren Whitesel

(57) ABSTRACT

An improved battery pack is disclosed. The improved battery pack is designed in light, thin, safe, and user-friendly card configuration to make interchangeability between appliances easy and possible. In addition, outside the battery card there is an injection mechanism that fits the battery card in electrical apparatus when slot-in and inject-out, and inside the battery card there is a built-in fuel gauge circuit that regulates voltage with a capacity indicator.

33 Claims, 10 Drawing Sheets

BATTERY PACK FOR ELECTRICAL APPARATUS

FIELD OF THE INVENTION

The present invention relates to a battery pack for an electrical apparatus, and more particularly to an improved battery card for an portable electrical apparatus.

BACKGROUND OF THE INVENTION

At the present time, all portable electrical apparatus including portable information appliances use internal battery pack for energy source. Battery pack contains several battery cells in series and/or in parallel arrangement, making the desired capacity and voltage to operate the appliance.

Battery cells in battery pack for portable information appliances are of two major categories, i.e., nickel metal hydride (NiMH) and lithium ion (Li-ion), because of their relatively high energy density. Conventional battery cells are configured in cylindrical and/or prismatic structures. FIG. 1 shows a cross-section view of a conventional battery cell in a cylindrical structure. As shown in FIG. 1, attaching media 11 with anode layer 12 and attaching media 13 with cathode layer 14 dissociated by a separator 15 are winded in a cylindrical can 16, making the most popular battery cell in cylindrical structure. FIG. 2 shows a cross-section view of a conventional battery cell in prismatic structure. As shown in FIG. 2, attaching media 21 with anode layer 22 and attaching media 23 with cathode layer 24 dissociated by a separator 25 are winded in a prismatic can 26, making rectangular battery cell for special applications.

Generally speaking, battery pack structures are determined by battery cell configurations. Conventional battery packs are bulky, heavy, and expensive when multiple battery cells are integrated. FIG. 3 shows an industry standard battery pack for notebook computers. The battery pack 3 contains several cylindrical Li-ion battery cells 31, with a circuitry board 32 embedded to gauge fuel and to monitor voltage/current when charging and discharging. In addition, the battery pack 3 has a five-pin output jack 33 connected to the notebook computer. Two of them are terminals for power transmission, the "+" and the "−". Others are reserved for communication between battery pack and computer (not shown) for battery cell temperature, battery cell data code, and voltage/current status of the battery pack. In FIG. 3 there are nine cylindrical battery cells 31 arranged in the battery pack 3, three in series and three in parallel. Each battery cell 31 sizes 18 mm in diameter, 65 mm in height, operating at 3.6V with a full capacity of 1.35 Ah. The battery pack 3 consisting of nine cylindrical battery cells 31 delivers 44 Wh (10.8V×4.05 Ah) with 150(W)×90(L)×21(T) mm in size and 490grams in weight. Such a battery pack 3 is able to operate a Pentium 300 notebook computer for approximately 3 hours (180 minutes).

Lately battery packs are designed as thin and light as possible in an attempt to fit slimmer and more compact appliances. FIG. 4 shows a slim battery pack for notebook computers containing prismatic battery cells. As shown in FIG. 4, the battery pack 4 contains several prismatic Li-ion battery cells 41, with a circuitry board 42 embedded to gauge fuel and to monitor voltage/current when charging and discharging. In addition, the battery pack 4 has a five-pin output jack 43 connected to notebook computer. Two of them are terminals for power transmission, the "+" and the "−". Others are reserved for communication between battery pack 4 and computer for battery cell temperature, battery cell data code, and voltage/current status of the battery pack.

Compared to the battery pack 3 of FIG. 3, the battery pack 4 of FIG. 4 has a reduced dimension in thickness because of using prismatic battery cells 41, normally less than 10 mm. However, battery run time is compromised because less conducting materials are used in smaller battery cells. Users have found difficulty in maintaining power continuity. With more frequent power shortage, data integrity becomes vulnerable in some worst scenarios.

In general, notebook computers incorporate only one battery pack. For heavy users, however, there are notebook computers mounted with two battery packs. They are not considered practical as weight and inconvenience are in concern.

In addition, all battery packs are not interchangeable with each other because of the design limitation so that customers cannot replace the battery pack unless from original device maker. Users are confined by inflexible battery pack form factor. Appliance manufacturers, as a result, are able to control battery accessory market at hefty prices with limited availability.

Specifically designed battery packs usually present specific safety concerns when inadvertently used outside the manufacturer's recommended guidelines. Recently, in-seat power supply system on aircraft has drawn public attention because users rarely detect battery health before they charge their battery in flight. Manufacturers have recommended Federal Aviation Administration (FAA) to place a moratorium on the use until safety issues can be resolved.

All listed disadvantages are obstacles to popularize portable information appliances. The present invention provides solutions with an entirely shifted paradigm.

SUGARY OF TEE INVENTION

It is therefore an object of the present invention to provide standardized battery packs in light, thin, safe, and user-friendly card configuration to make interchangeability between appliances easy and possible.

It is further an object of the present invention to provide a safe battery pack, by which issues of public safety can be minimized without adding any inconvenience to mobile users when battery packs are charged on a separate charger outside the appliance or a charger built-in the appliance.

It is still an object of the present invention to provide a battery pack having a safety design to prevent from shortage due to mishandling when the battery pack is not in use.

It is further an object of the present invention to provide a battery pack having higher weight and volume energy density which are designed easy to carry, to store, and to exchange.

The present invention provides a battery card which is adapted to be used with an electrical apparatus to be power-supplied by the battery card. The battery card of the present invention contains several power-supplying cells (at least one power-supplying cell) in series and/or in parallel arrangement, making the desired capacity and voltage to operate the electrical apparatus. The first power-supplying cell arranged in the battery card includes two first planar attaching media respectively attaching thereto a first cathode material and a first anode material, and a first planar separator separating the first attaching media on the one hand and communicating the two first attaching media with each other on the other hand. The second power-supplying cell arranged in the battery card also includes two second planar attaching media respectively attaching thereto a second cathode material and a second anode material, and a second planar separator separating the second attaching media on the one hand and communicating the second attaching media with each other on the other hand. There is a housing housing therein the first and the second power-supplying cells to form the battery card having a weight energy density larger than 40 watt-hours/kilograms and a volume energy density larger than 100 watt-hours/liter. In addition, two contacts are mounted on the housing and respectively electrically connected to the first and the second power-supplying cells for power-supplying the electrical apparatus therethrough.

In accordance with one aspect of the present invention, the battery card preferably has a weight energy density larger than 80 watt-hours/kilograms and a volume energy density larger than 200 watt-hours/liter.

Preferably the electrical apparatus is a portable information appliance.

Preferably the housing has a major square plane, and more preferably the plane has either one of sides thereof shorter than 10 cm.

Alternatively, the housing is substantially a parallelepiped having a thickness smaller than 1.5 cm, and preferably less than 1 cm. Preferably, the parallelepiped has either one of sides thereof smaller than 15 cm.

Preferably the battery card is rechargeable, and more preferably the battery card is rechargeable in the electrical apparatus or through an external charger.

In accordance with another aspect of the present invention, the battery card further electrically connects therein a protection circuit for safeguarding the battery card from working at a voltage greater or lower than a specific value.

In accordance with another aspect of the present invention, the battery card further electrically connects therein a fuel gauge for showing how much capacity said battery card keeps.

In accordance with another aspect of the present invention, the battery card further electrically connects therein a capacity display for displaying a capacity of the battery card.

Preferably the housing is made of one of ABS (Acrylonitrile-Butadiene-Styrene resin) and manganese-aluminum alloy.

In accordance with another aspect of the present invention, the battery card further includes 7 power-supplying cells wherein the 9 power-supplying cells are divided into 3 parallelly connected groups each of which includes 3 serially connected power-supplying cells.

In accordance with another aspect of the present invention, the battery card further electrically connects therein a recharging circuit for enabling the battery card to be recharged thereby.

Preferably two contacts are shielded from exposure until inserted into the electrical apparatus.

Certainly, two first planar attaching media and two second planar attaching media are rigid.

In according with another aspect of the present invention, the battery card further includes a first casing housing therein the first power-supplying cell, and a second casing housing therein the second power-supplying cell electrically connected to the first power-supplying cell in series.

It is further another object of the present invention to provide a battery card adapted to be used with an electrical apparatus to be power-supplied by the battery card. The battery card contains several power-supplying cells (at least one power-supplying cell) in series and/or in parallel arrangement, making the desired capacity and voltage to operate the electrical apparatus. The first power-supplying cell arranged in the battery card includes two first attaching media respectively attaching thereto a first cathode material and a first anode material, a first separator separating the first attaching media on the one hand and communicating the two first attaching media with each other on the other band, and a first casing housing therein the first power-supplying cell. The second power-supplying cell arranged in the battery card also includes two second attaching media respectively attaching thereto a second cathode material and a second anode material, a second separator separating the second attaching media on the one hand and communicating the second attaching media with each other on the other hand, and a second casing housing therein the second power-supplying cell. There is a housing having a thickness smaller than 1.5 cm and housing therein the first and the second casings to form the battery card having a weight energy density larger than 40 watt-hours/kilograms and a volume energy density larger than 100 watt-hours/liter. In addition, there are two contacts mounted on the housing and respectively electrically connected to the first and the second power-supplying cells for power-supplying the electrical apparatus therethrough.

Preferably the attaching media and the separators are windable into being cylindrically shaped. Alternatively, the attaching media and the separators are windable into being prismatically shaped.

Preferably the housing is substantially a parallelepiped having a dimension smaller than 15 cm, and more preferably smaller than 10 cm.

Preferably the first and second power-supplying cells are electrically connected in series.

Preferably the thickness of the battery card is smaller than 1 cm.

Preferably the battery card has an overall weight smaller than 180 g, and more preferably smaller than 150 g.

Certainly, the attaching media respectively attach on two opposite side surfaces thereof the cathode material and the anode material.

It is still further an object of the present invention to provide an electrical apparatus includes a casing having a card slit, and a battery card replaceably insertable into the card slit for power-supplying the electrical apparatus. The battery card includes two first planar attaching media respectively attaching thereto a first cathode material and a first anode material, a first planar separator separating the first attaching media on the one hand and communicating the two first attaching media with each other on the other hand to form a first power-supplying cell, two second planar attaching media respectively attaching thereto a second cathode material and a second anode material, a second planar separator separating the second attaching media on the one hand and communicating the second attaching media with each other on the other hand to form a second power-supplying cell electrically connected to the first power-supplying cell in series, a housing housing therein the first and the second power-supplying cells to form the battery card having a weight energy density larger than 40 watt-hours/kilograins and a volume energy density larger than 100 watt-hours/liter, and two contacts mounted on the housing and respectively electrically connected to the first and the second power-supplying cells for power-supplying the electrical apparatus therethrough.

In accordance with one aspect of the present invention, the battery card preferably has a weight energy density larger than 80 watt-hours/kilograms and a volume energy density larger than 200 watt-hours/liter.

Preferably the housing is substantially a parallelepiped having a dimension smaller than 15 cm, and more preferably smaller than 10 cm.

Preferably housing has a thickness smaller than 1.5 cm, and preferably smaller than 1 cm.

Preferably the casing of the electrical apparatus further includes a slot, and the electrical apparatus further includes a battery card assembly slidably inserted into the slot and having the card slit.

It is still further an object of the present invention to provide an electrical apparatus includes a casing having a card slit, and a battery card replaceably insertable into the card slit for power-supplying the electrical apparatus. The battery card includes two first attaching media respectively attaching thereto a first cathode material and a first anode material, a first separator separating the first attaching media on the one hand and communicating the two first attaching media with each other on the other hand to form a first power-supplying cell, a first casing housing therein the first power-supplying cell, two second attaching media respectively attaching thereto a second cathode material and a second anode material, a second separator separating the second attaching media on the one hand and communicating the second attaching media with each other on the other hand to form a second power-supplying cell electrically connected to the first power-supplying cell, a second casing housing therein the second power-supplying cell, a housing having a thickness smaller than 1.5 cm and housing therein the first and the second casings to form the battery card having a weight energy density larger than 40 watt-hours/kilograins and a volume energy density larger than 100 watt-hours/liter, and two contacts mounted on the housing and respectively electrically connected to the first and the second power-supplying cells for power-supplying the electrical apparatus therethrough.

Preferably the thickness of the battery card is smaller than 1 cm.

Preferably the battery card has a weight energy density larger than 80 watt-hours/kilograms and a volume energy density larger than 200 watt-hours/liter.

Preferably the housing of the battery card is substantially a parallelepiped having a dimension smaller than 15 cm, and more preferably smaller than 10 cm.

Preferably the first and second power-supplying cells are electrically connected in series.

Preferably the casing of the electrical apparatus further includes a slot, and the electrical apparatus further includes a battery card assembly slidably inserted into the slot and having the card slit.

The present invention may best be understood through the following descriptions with reference to the accompanying drawings, in which:

DETAILED DESCRIPTION OF THE PREFERRED EMBODIMENT

The present invention is a battery card, and an electrical apparatus where the battery card slots in. The battery card of the present invention is designed easy to carry, to store, and to exchange.

Figure 1:
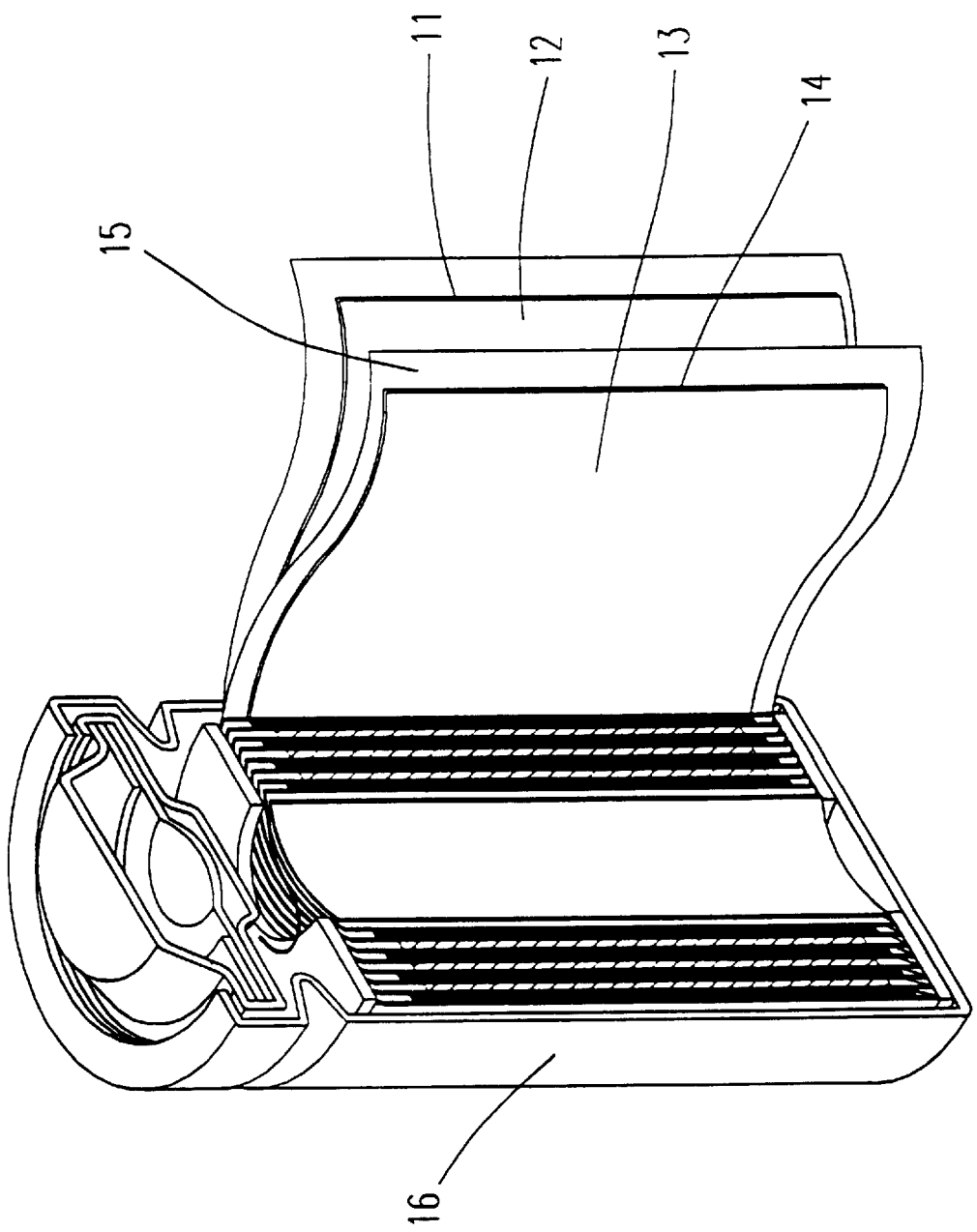
FIG. 1 is a cross-section view of a conventional battery cell in cylindrical stricture.
Figure 2:
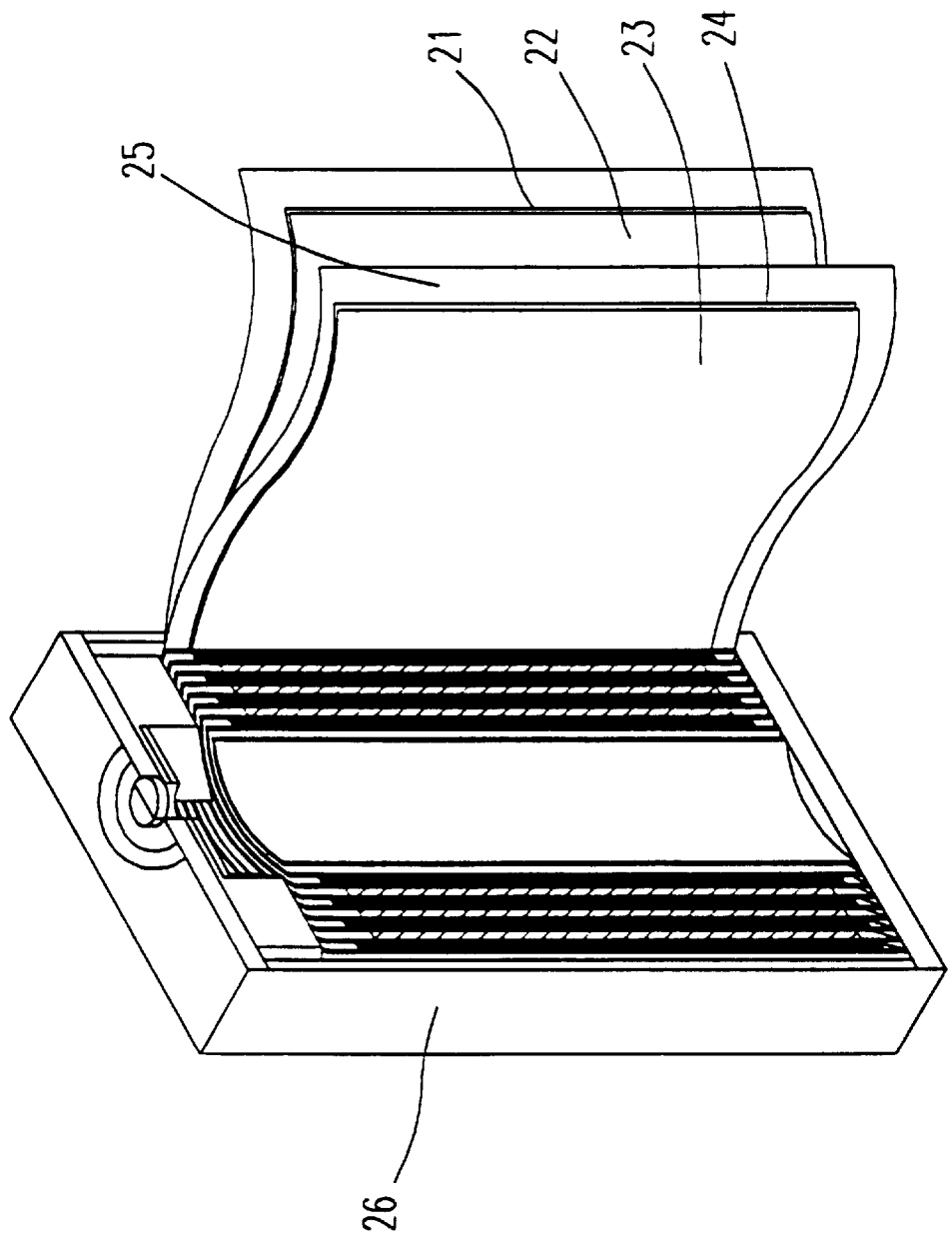
FIG. 2 is a cross-section view of a conventional battery cell in prismatic structure.
Figure 3:
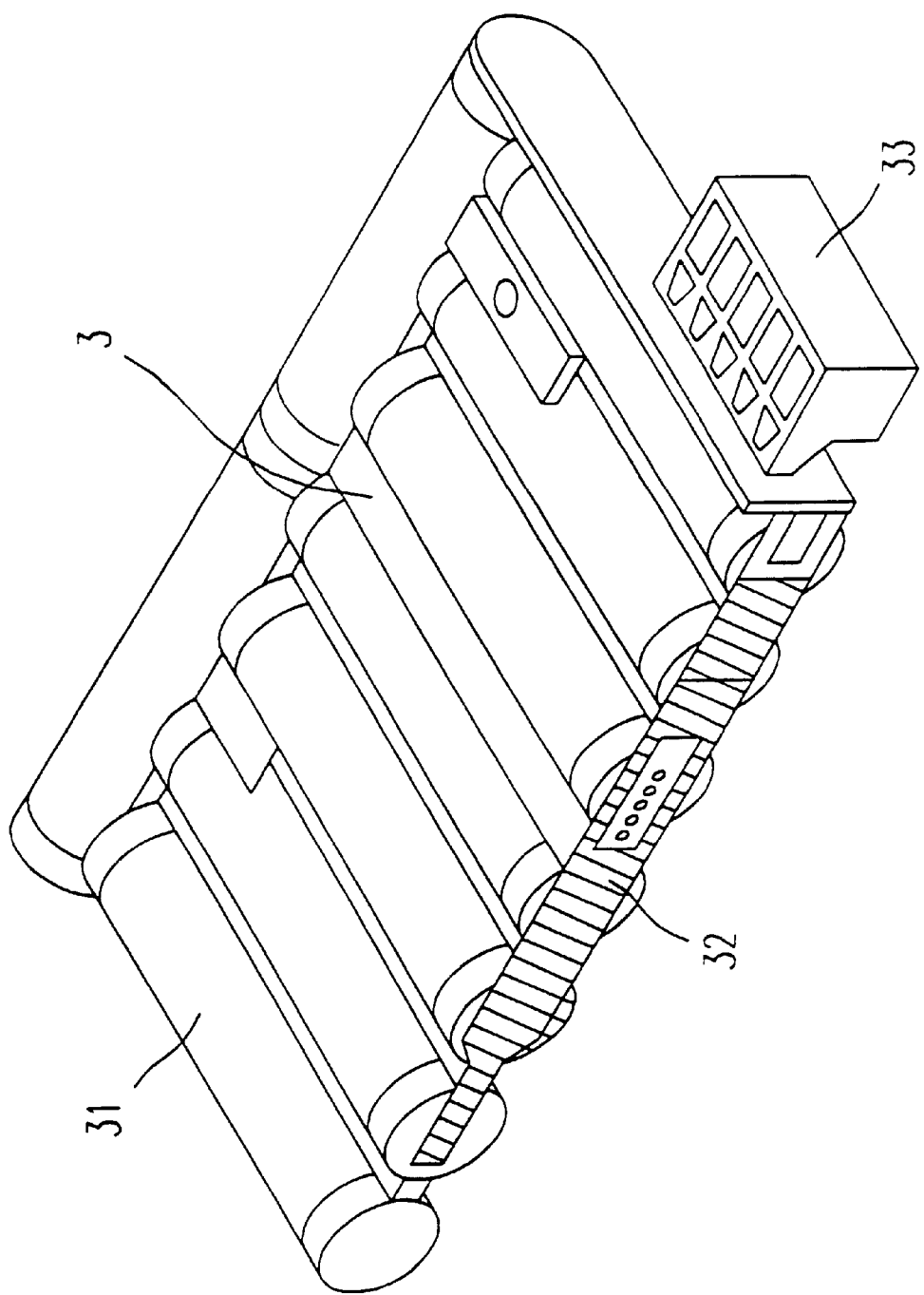
FIG. 3 is a conventional battery pack for notebook computer containing cylindrical battery cells.
Figure 4:
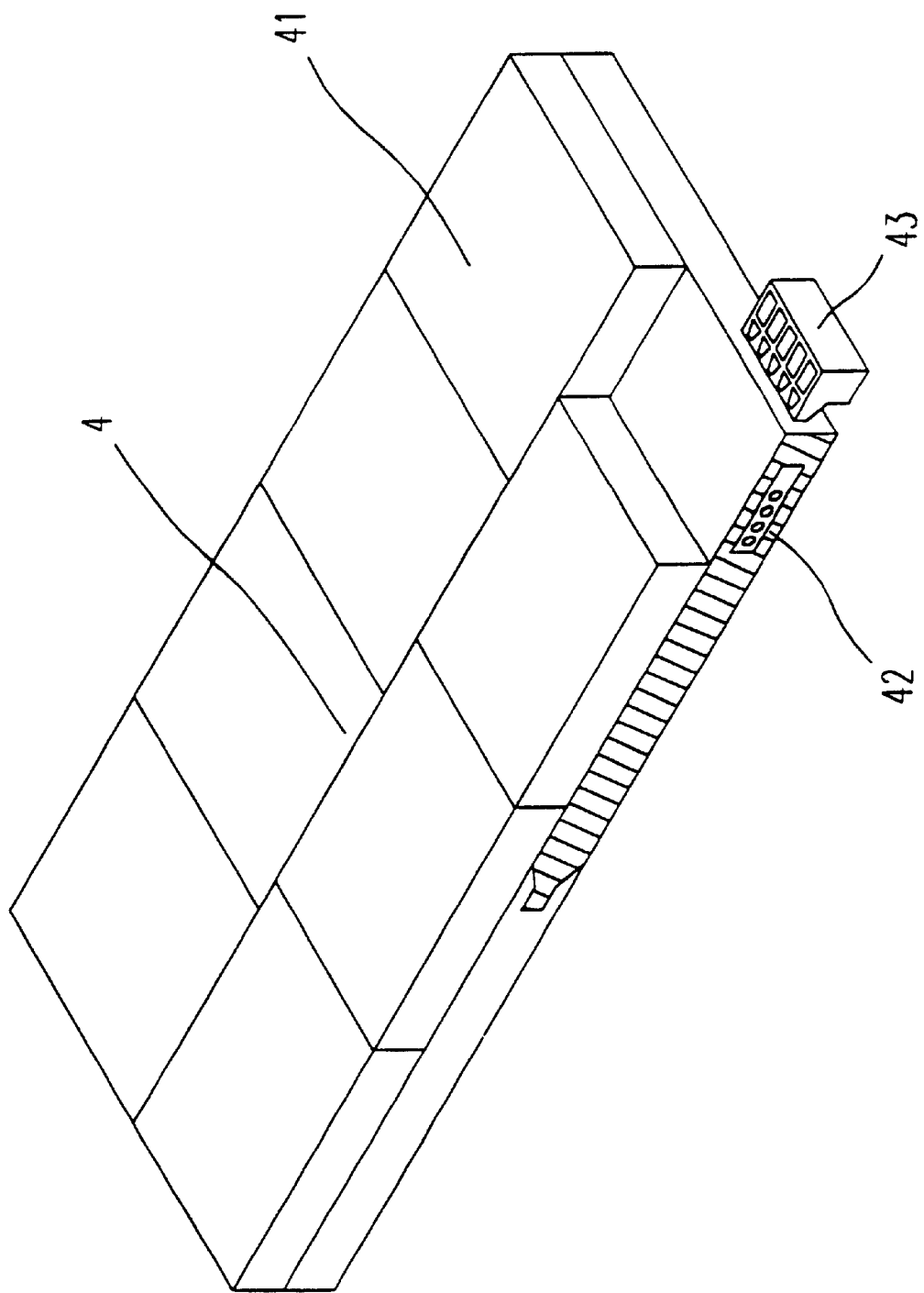
FIG. 4 is a conventional battery pack for notebook computer containing prismatic battery cells.
Figure 5:
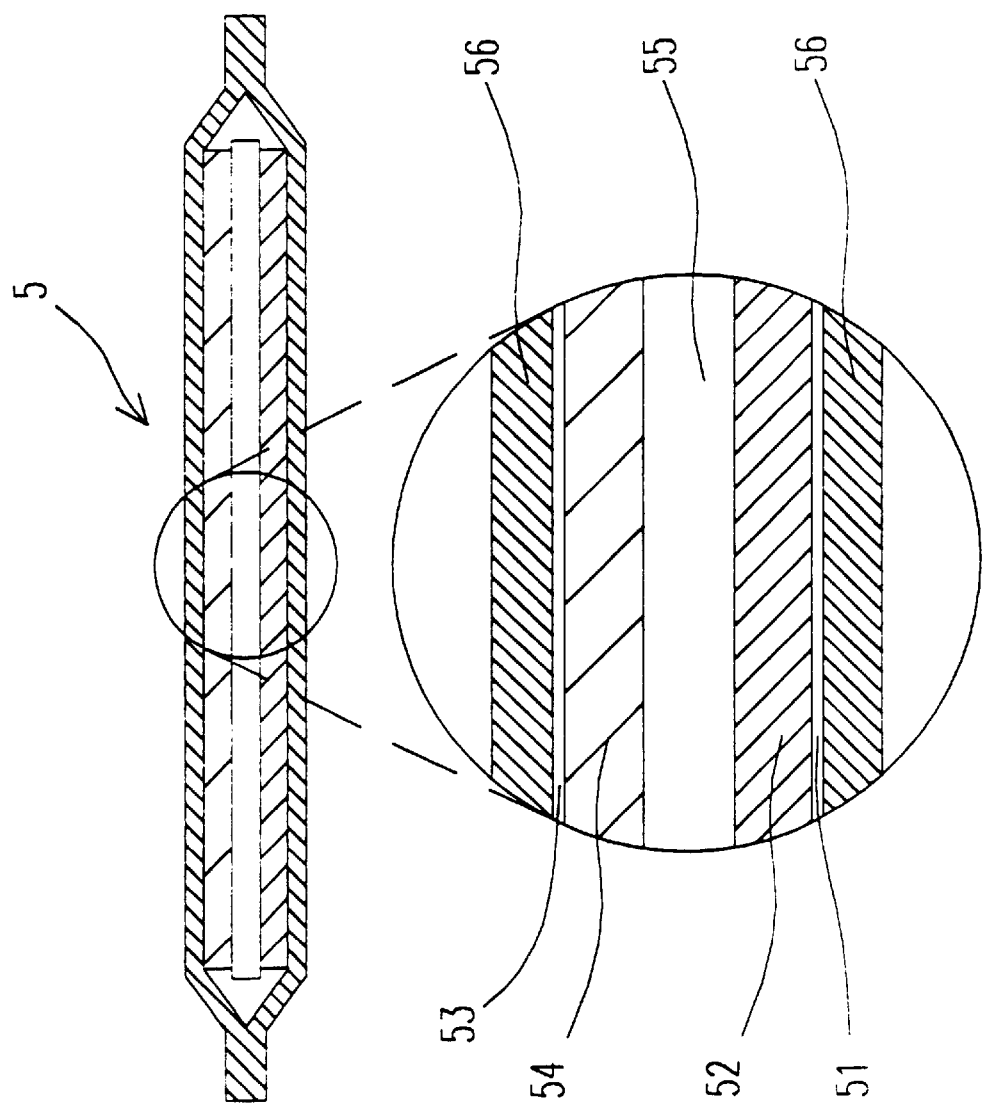
FIG. 5 is a cross-section view of polymeric battery cell in flat shape.
Figure 6:
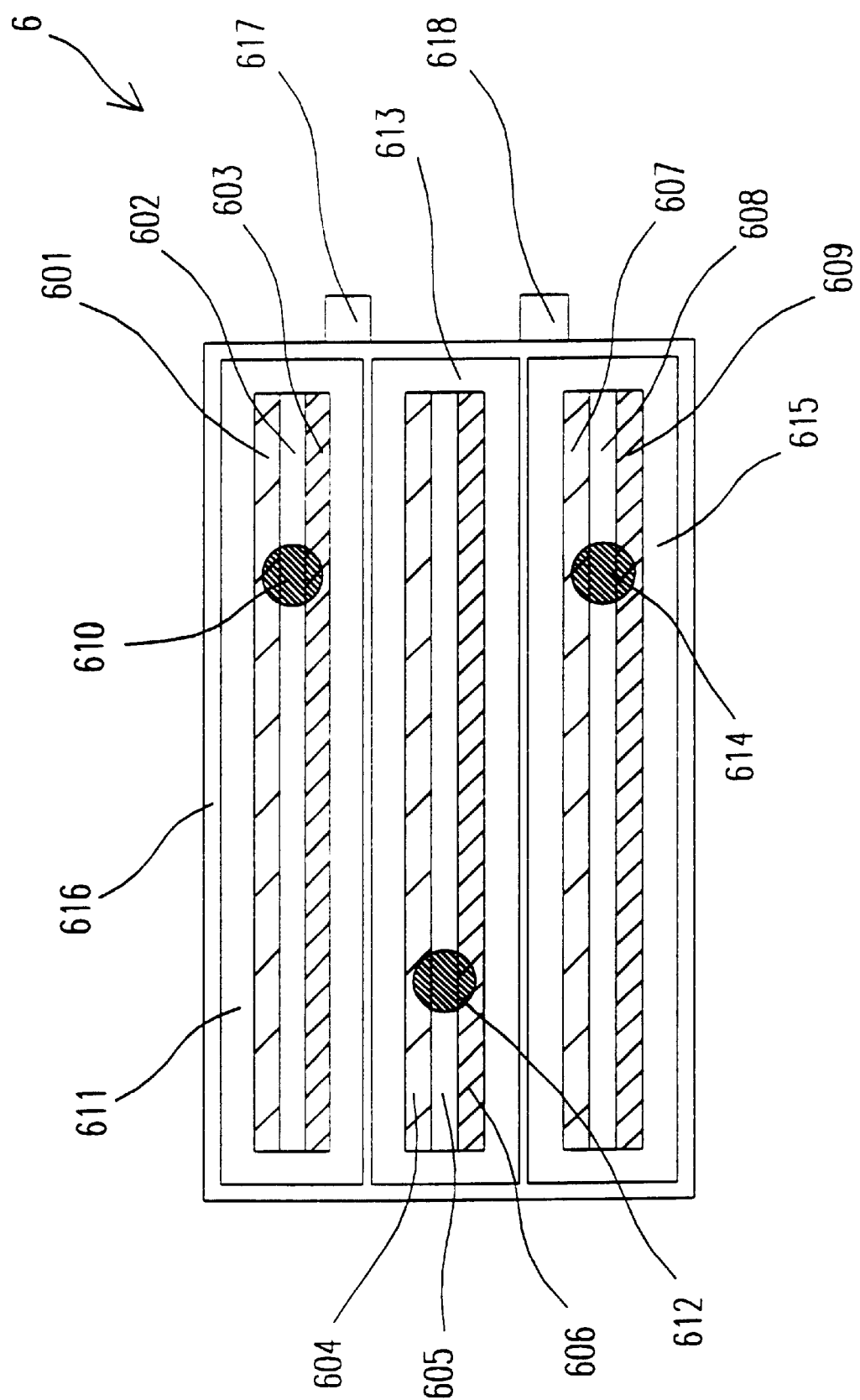
FIG. 6 is a cross-section view of a preferred battery card embodiment containing several battery cells in floppy disk size.

The battery card of the present invention is adapted to be used with an electrical apparatus to be power-supplied by the battery card. Preferably, the electrical apparatus is a portable information appliance. The battery card of the present invention contains several battery cells (at least one battery cell) in series and/or in parallel arrangement, making the desired capacity and voltage to operate the electrical apparatus. Battery cells arranged in the battery card can be of any configuration, cylindrical or prismatic, as long as the geometry agrees with the card dimension after cells coupling. Recently developed polymeric battery cell in flat shape is another choice of battery cell in battery card. FIG. 5 shows a cross-section view of a polymeric battery cell in flat shape. As shown in FIG. 5, attaching media 51 with anode layer 52 and attaching media 53 with cathode layer 54 are dissociated by a separator 55. Layers are laminated with a matrix of polymer materials and sealed in a flat casing 56. However, the amount of the battery cell contained in a battery card should not be limited. FIG. 6 shows a cross-section view of a preferred battery card embodiment containing several battery cells in floppy disk size. As shown in FIG. 6, the battery card 6 contains nine polymeric battery cells 601~609 in credit card size, each of which has a structure as that of the polymeric battery cell 5 shown in FIG. 5. The first battery cell 601 includes two first planar attaching media respectively attaching thereto the first cathode material and the first anode material, and a first planar separator separating the first attaching media on the one hand and communicating the two first attaching media with each other on the other hand. The second battery cell 602 also includes two second planar attaching media respectively attaching thereto a second cathode material and a second anode material, and a second planar separator separating the second attaching media on the one hand and communicating the second attaching media with each other on the other hand.

In FIG. 6 battery cells 601, 602, and 603 are connected in parallel, forming a group cell 610 sealed in an internal casing 611. Battery cells 604, 605, and 606 are connected in parallel, forming a group cell 612 sealed in an internal casing 613. Battery cells 607, 608, and 609 are connected in parallel, forming a group cell 614 sealed in an internal casing 615. Group cells 610, 612, and 614 are further connected in series to form a final battery card 6 sealed in a housing 616. In addition, there are two contacts (617 and 618) mounted on the housing 616 and electrically connected to battery cells 601~609 for power-supplying the electrical apparatus therethrough. Therefore, the battery card 6 can be wired to a battery card cartridge (not shown) through positive and negative terminals (617 and 618). Preferably the two contacts (617 and 618) are designed to be shielded from exposure until inserted into the electrical apparatus.

The battery card of the present invention has a weight energy density larger than 40 watt-hours/kilograms and a volume energy density larger than 100 watt-hours/liter. Preferably, the battery card has a weight energy density larger than 80 watt-hours/kilograins and a volume energy density larger than 200 watt-hours/liter.

The housing of the battery card has a major square plane. Preferably the plane has either one of sides thereof shorter than 10 cm. Alternatively, the housing of the battery card is substantially a paralleleiped having a thickness smaller than 1.5 cm, and more preferably less than 1 cm. The paralleleiped has either one of sides thereof smaller than 15 cm, preferably less than 10 cm. However, the shape of the housing should not be limited. In addition, the battery card has an overall weight smaller than 180 g, and preferably smaller than 150 g.

The battery card of the present invention contains battery cells in a plastic and/or metal alloy housing. Housing materials are light, thin, firm, crush resistant, and good for heat dissipation. ABS (Acrylonitrile-Butadiene-Styrene resin) and magnesium-aluminum alloy are current choices.

Battery cells in the battery card of the present invention can be of any renewable battery chemistry, nickel metal hydride (NiMH), lithium-ion (Li-ion), zinc air, and/or other electrochemical system to be developed. Battery cells are coupled inside the battery card in series and/or in parallel arrangement, making desired capacity and voltage to operate the appliances.

Figure 7:
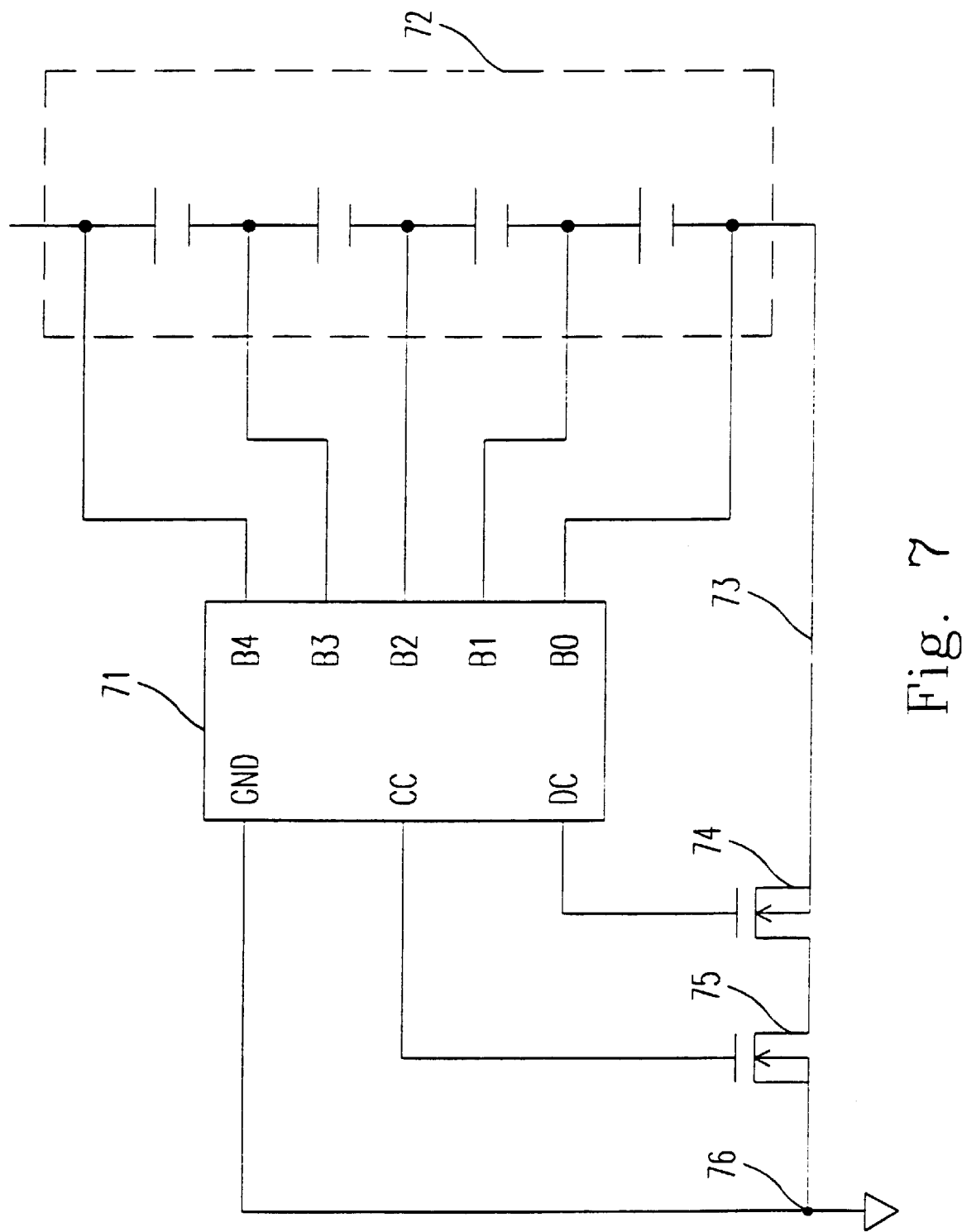
FIG. 7 shows the battery recharging/protection device and the connection thereof to a battery card with a series of battery cells.

The battery card of the present invention is rechargeable. The battery card electrically connects therein a recharging circuit for enabling the battery card to be recharging thereby. Therefore, the battery card can be recharged by an independent charger outside the appliance, by connection to charger within the electrical apparatus, or by connection to wall power jack for direct charge from AC power supply. In addition, the battery card contains protection circuit for safeguarding the battery card from working at a voltage greater or lower than a specific value (i.e. prevent battery cells from being overcharged and/or over discharged). FIG. 7 shows a block diagram of a battery recharging/protection circuit 71 connected to a battery card 72 containing four battery cells in series. Inputs (B4, B3, B2 and B1) in the recharging/protection circuit 71 are connected to corresponding positive terminals of battery cells in battery card 72. Input B0 is connected to the negative terminal 73 of the battery card 72. A selector (not shown) in the recharging/protection circuit 71 is able to select combination of B0-B4 to examine voltage of any individual battery cell in the battery card 72. The negative terminal 73 is connected to transistors 74 and 75, then to ground terminal 76. Ground terminal 76 connects to the GND input in the recharging/protection circuit 71. The gate of transistor 74 is connected to the DC output, associated with a discharge operation, of the recharging/protection device 71. The gate of transistor 75 is connected to the CC output, associated with a charging operation, of the recharging/protection circuit 71.

Figure 8:
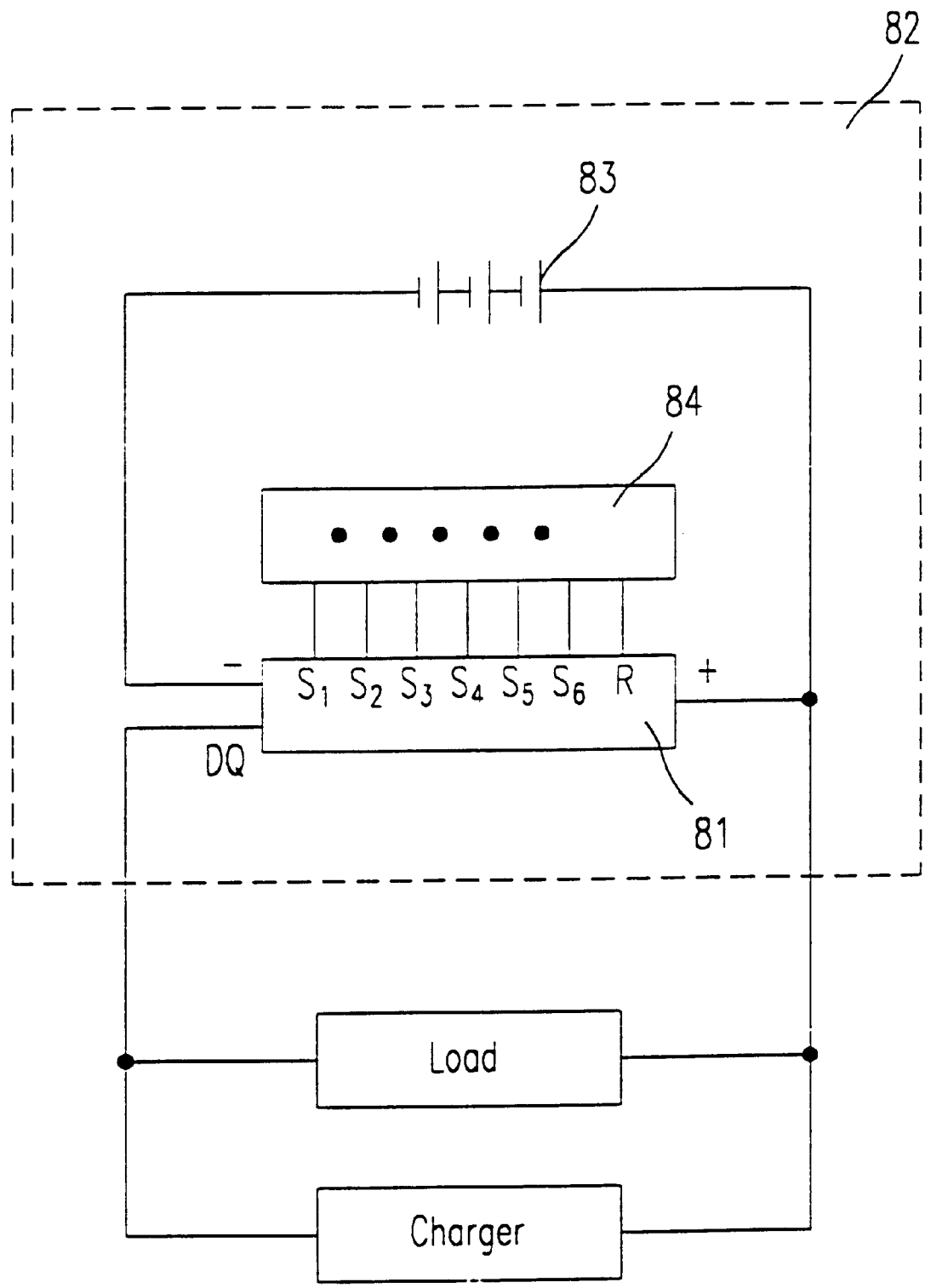
FIG. 8 shows a block diagram of fuel gauge circuit embedded in battery card.

Battery cards of the present invention are embedded with a fuel gauge circuit for detecting battery capacity and showing how much capacity the battery card keeps. The battery card includes a capacity display for displaying the capacity of the battery card. FIG. 8 shows a block diagram of the fuel gauge connection, wherein fuel gauge circuit 81 is embedded in the battery card 82. The fuel gauge circuit 81 is connected to battery cells 83 and the serial communication port (DQ). The fuel gauge circuit 81 contains light emitting diode array 84 that displays detected information. In demonstration there are five segments of display connected to six terminals and a common output.

Figure 9:
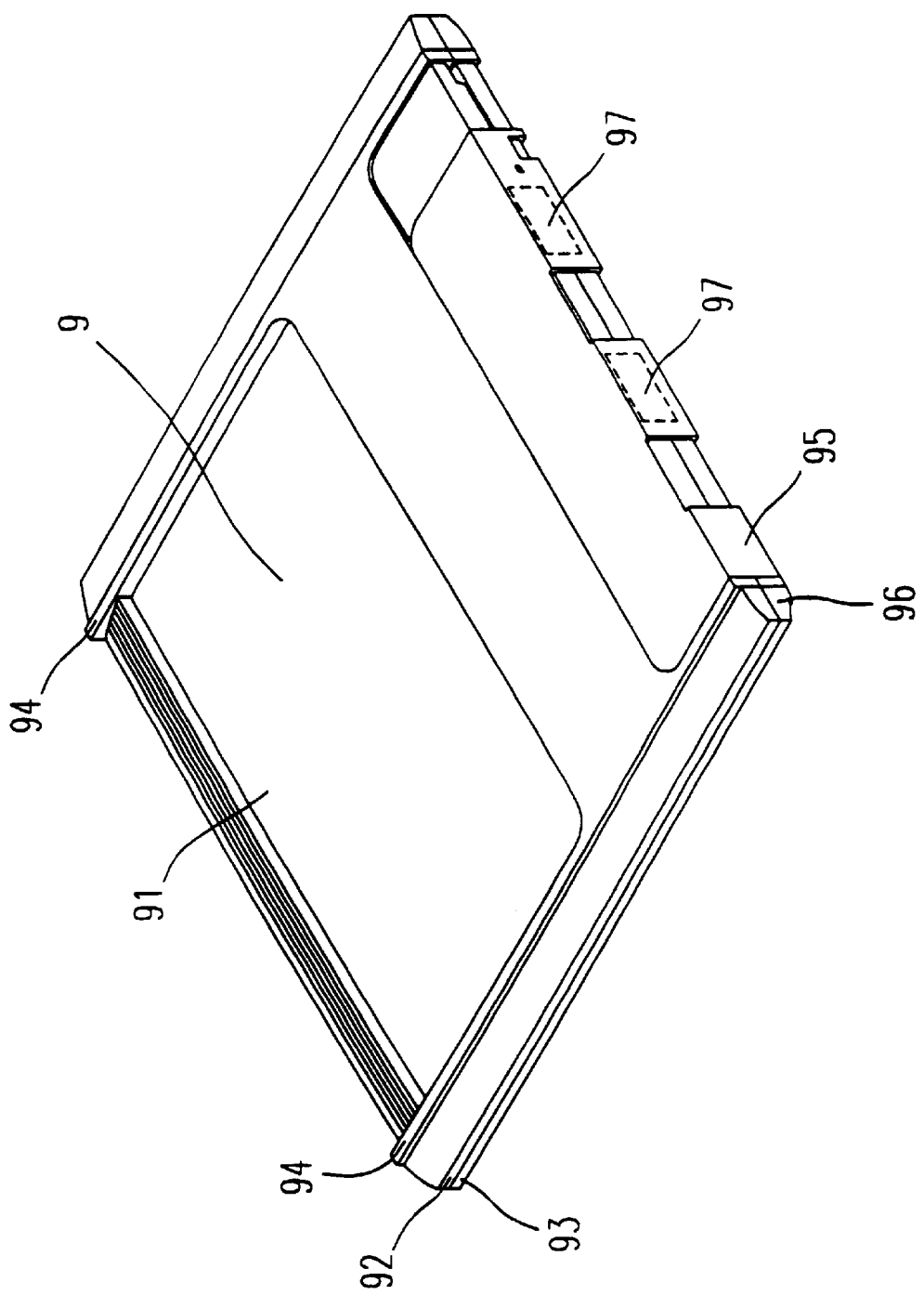
FIG. 9 shows a battery card with shutter closed when not in use.
Figure 10:
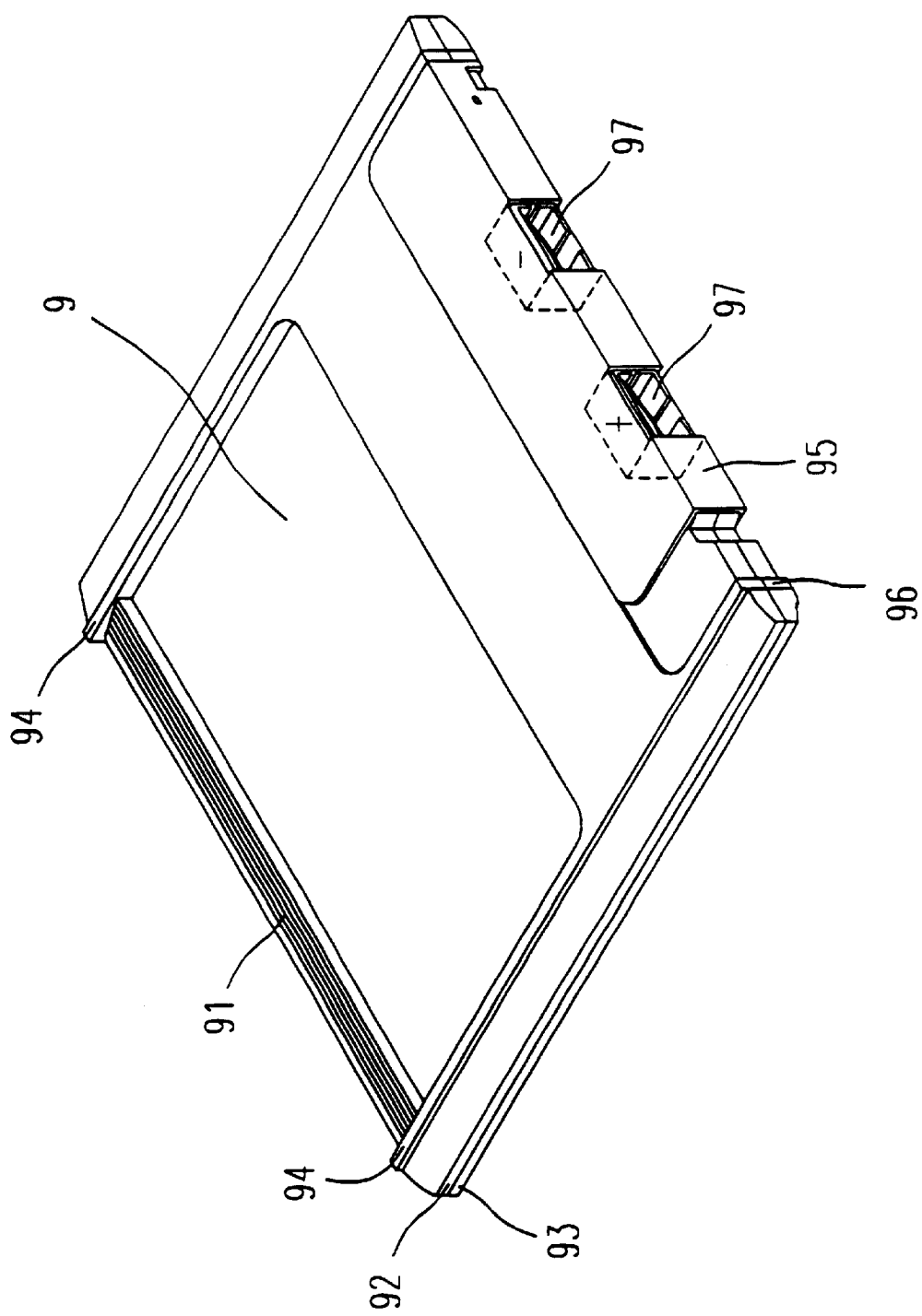
FIG. 10 shows a battery card with shutter open when inserted into the cartridge.

FIG. 9 shows a basic design of the battery card according to the present invention. The battery card 9 includes a housing 91 made of upper shell 92 and lower shell 93. Along the surface there are tracking rails 94 that match the battery card to a cartridge in an electrical apparatus (not shown) where the battery card slots in. A shutter 95 is provided on the front peripheral edge 96 of the housing 91 to cover the access 97, which contains "+" and "−" power outputs, when not in use. FIG. 10 shows when battery card 9 is inserted into the cartridge in an electrical apparatus (not shown), the shutter 95 moves to the other side exposing the access 97, which contains "+" and "−" power outputs, to cartridge terminal.

Embodiments of Battery Card

1. A battery card made of cylindrical battery cells (less preferred)

A battery card consists of thee cylindrical Li-ion battery cells coupled in series. Each battery cell operates at 3.6V with a full capacity of 1.35 Ah. Battery cell sizes 18 mm in diameter, 65 mm in height, and weighs 42 g. The battery card sizes 54(W)×65(L)×18(T) mm, and weighs 126 g before circuit and case finish. The battery card delivers 14.6 Wh (10.8V×1.35 Ah), good for operating a Pentium-un 300 notebook computer for 60 minutes.

2. A battery card made of prismatic battery cells (less preferred)

A battery card consists of thee prismatic Li-ion battery cells coupled in series. Each battery cell operates at 3.6V with a full capacity of 0.95 Ah. Battery cell sizes 34(W)×48(L)×9(T) mm, and weighs 40 g. The battery card sizes 102(W)×48(L)×9(T) mm, and weighs 120 g before circuit and case finish. The battery card delivers 10.3 Wh (10.8V×0.95 Ah), good for operating a Pentium 300 notebook computer for 42 minutes.

3. A battery card made of credit card size polymeric battery cells (more preferred)

A battery card in credit card size consists of four polymeric Li-ion battery cells in parallel. Each battery cell operates at 3.6V with a full capacity of 0.3Ah. Battery cell sizes 85(W)×55(L)×0.75(T) mm, and weighs 9 g. The battery card sizes 85(W)×55(L)×3.2(T) mm, and weighs 36 g before circuit and case finish. The battery card delivers 4.32 Wh (3.6V×1.2 Ah), good for operating a GSM cellular handset longer than 40 hours of talk time and/or 150 hours of standby.

4. A battery card made of floppy disk size polymeric battery cells (more preferred)

A battery card in floppy disk size consists of nine polymeric Li-ion battery cells, three in series and thee in parallel. Each battery cell operates at 3.6V with a fall capacity of 0.5 Ah. Battery cell sizes 90(W)×90(L)×0.75(T) mm, and weighs 15 g. The battery card sizes 90(W)×90(L)×7.4(T) mm, and weighs 135 g before circuit and case finish. The battery card delivers 16.2 Wh (10.8V×1.5 Ah), good for operating a Pentium 300 notebook computer for 66 minutes.

5. A battery card made of A4 size polymeric battery cells (more preferred)

A battery card in A4 size consists of three polymeric Li-ion battery cells in series. Each battery cell operates at 3.6V with a full capacity of 3.7 Ah. Battery cell sizes 280(W)×210(L)×0.75(T) mm, and weighs 110 g. The battery card sizes 280(W)×210(L)×2.4(T) mm, and weighs 330 g before circuit and case finish. The battery card delivers 40 Wh (10.8V×3.7 Ah), good for operating a Pentium 300 notebook computer for 163 minutes.

According to the present invention, the casing of the electrical apparatus has a card slit. The battery card can be replaceably inserted into the card slit for power-suppling the electrical apparatus. Alternatively, the casing of the electrical apparatus can be designed to have a slot. A battery card assembly, i.e. cartridge, having a card slit can be slidably inserted into the slot of the electrical apparatus for receiving the battery card.

In addition, the electrical apparatus of the present invention can be designed to have a capacity detector for detecting how much capacity the battery cards keep, and a power shortage warner which will signal when the battery card nearly runs short of capacity. Certainly, electrical apparatus can be designed to include a display electrically connected to the power shortage warner for warning a user that the battery card runs short of capacity.

According to the description with reference to the accompanying drawings, the improved battery pack of the present invention is designed in light, thin, safe, and user-friendly card configuration with a relative high weight and volume energy density. In addition, the battery card of the present invention provides a safety design, by which issues of public safety can be minimized without adding any inconvenience to mobile users when battery cards are charged on a separate charger outside the appliance or a charger built-in the appliance. Moreover, battery packs in card shape can be standardized that makes interchangeability between appliances easy and possible. Therefore, the battery card of the present invention improves the defect encountered by the prior arts.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. A battery card adapted to be used with an electrical apparatus to be supplied power by said battery card comprising:
    two first planar attaching media respectively attaching thereto a first cathode material and a first anode material;
    a first planar separator separating said first attaching media and communicating said two first attaching media with each other simultaneously to form a first power-supplying cell;
    two second planar attaching media respectively attaching thereto a second cathode material and a second anode material;
    a second planar separator separating said second attaching media and communicating said second attaching media with each other simultaneously to form a second power-supplying cell electrically connected to said first power-supplying cell;
    a housing containing therein said first and said second power-supplying cells to form said battery card having a weight energy density larger than 40 watt-hours/kilograms and a volume energy density larger than 100 watt-hours/liter;
    two contacts mounted in an access of said housing and respectively electrically connected to said first and said second power-supplying cells for supplying power to said electrical apparatus through said two contacts; and
    a shutter moveably disposed on the peripheral edge of said housing to cover said access so as to shield said two contacts from exposure until said battery card is inserted into said electrical apparatus.

2. A battery card according to claim 1 wherein said electrical apparatus is portable.

3. A battery card according to claim 1 wherein said housing has a major square plane.

4. A battery card according to claim 1 wherein said housing generally is a parallelepiped.

5. A battery card according to claim 4 wherein said parallelepiped has a thickness smaller than 1.5 cm.

6. A battery card according to claim 1 wherein said electrical apparatus is an information appliance.

7. A battery card according to claim 1 wherein said card is rechargeable.

8. A battery card according to claim 7 wherein said card is rechargeable in said electrical apparatus.

9. A battery card according to claim 7 wherein said card is rechargeable in said electrical apparatus.

10. A battery card according to claim 1, further electrically connecting therein a protection circuit for preventing said battery card being overcharged and/or over discharged.

11. A battery card according to claim 1, further electrically connecting therein a fuel gauge for showing how much Ampere-hour capacity said battery card keeps.

12. A battery card according to claim 1 wherein said housing is made of one of ABS (Acrylonitrile-Butadiene-Styrene resin) and manganese-aluminum alloy.

13. A battery card according to claim 1, further comprising 7 power-supplying cells in addition to said first and second power-supplying cells, thereby providing a total of 9 power-supplying cells and wherein said 9 power-supplying cells are divided into 3 parallel connected groups, each of said groups including 3 serially connected power-supplying cells.

14. A battery card according to claim 1, further electrically connecting therein a recharging circuit enabling said battery card to be recharged thereby.

15. A battery card according to claim 1 wherein said two first planar attaching media and said two second planar attaching media are rigid.

16. A battery card according to claim 1, further comprising:
    a first casing housing therein said first power-supplying cell; and
    a second casing housing therein said second power-supplying cell electrically connected to said first power-supplying cell in series.

17. A battery card adapted to be used with an electrical apparatus to be supplied power by said battery card comprising:
    two first attaching media respectively attaching thereto a first cathode material and a first anode material;
    a first separator for separating said first attaching media and for enabling simultaneous communication between said two first attaching media to form a first power-supplying cell;

a first casing housing therein said first power-supplying cell;

two second attaching media for respectively attaching thereto a second cathode material and a second anode material;

a second separator for separating said second attaching media and simultaneously communicating said second attaching media with each other to form a second power-supplying cell electrically connected to said first power-supplying cell;

a second casing housing in said second power-supplying cell;

a housing having a thickness smaller than 1.5 cm and housing therein said first and said second casings to form said battery card having a weight energy density larger than 40 watt-hours/kilograms and a volume energy density larger than 100 watt-hours/liter;

two contacts mounted on said housing and respectively electrically connected to said first and said second power-supplying cells for supplying power to said electrical apparatus therethrough; and a protection circuit for preventing said battery card from being overcharged and/or over discharged.

18. A battery card according to claim 17 wherein said attaching media and said separators are wound into a cylindrical shape.

19. A battery card according to claim 17 wherein said attaching media and said separators are wound into a prismatical shape.

20. A battery card according to claim 17 wherein said housing is substantially a parallelepiped.

21. A battery card according to claim 20 wherein said housing has a dimension smaller than 15 cm.

22. A battery card according to claim 17 wherein said first and second power-supplying cells are electrically connected in series.

23. A battery card according to claim 17 having an overall weight smaller than 180 g.

24. A battery card according to claim 17 wherein said attaching media respectively attach on two opposite side surfaces thereof said cathode material and said anode material.

25. An electrical apparatus comprising:

a casing having a card slit; and a battery card replaceably insertable into said card slit for supplying power to said electrical apparatus and including:

two first planar attaching media respectively attaching thereto a first cathode material and a first anode material;

a first planar separator for separating said first attaching media and for enabling simultaneous communication between said two first attaching media to form a first power-supplying cell;

two second planar attaching media respectively attaching thereto a second cathode material and a second anode material;

a second planar separator for separating said second attaching media and for simultaneously communicating said second attaching media with each other to form a second power-supplying cell electrically connected in a series with said first power-supplying cell in series;

a housing containing said first and said second power-supplying cells to form said battery card having a weight energy density larger than 40 watt-hours/kilograms and a volume energy density larger than 100 watt-hours/liter;

two contacts mounted in an access of said housing and respectively electrically connected to said first and said second power-supplying cells for supplying power to said electrical apparatus through said two contacts; and a shutter moveably disposed on the front peripheral edge of said housing to cover said access so as to shield said two contacts from being exposed until said battery card is inserted into said electrical apparatus.

26. An electrical apparatus according to claim 25 wherein said housing is generally a parallelepiped.

27. An electrical apparatus according to claim 26 wherein said housing has a dimension smaller than 15 cm.

28. An electrical apparatus according to claim 26 wherein said housing has a thickness smaller than 1.5 cm.

29. An electrical apparatus according to claim 25 wherein:

A said casing further includes a slot; and said electrical apparatus further includes a battery card assembly slidably inserted into said slot and having said card slit.

30. An electrical apparatus comprising:

a casing having a card slit; and a battery card replaceably insertable into said card slit for supplying power to said electrical apparatus and including:

two first attaching media respectively attaching thereto a first cathode material and a first anode material;

a first separator for separating said first attaching media and for simultaneously communicating said two first attaching media with each other to form a first power-supplying cell;

a first casing housing in said first power-supplying cell;

two second attaching media respectively attaching thereto a second cathode material and a second anode material;

a second separator for separating said second attaching media and simultaneously communicating said second attaching media with each other to form a second power-supplying cell electrically connected to said first power-supplying cell;

a second casing housing in said second power-supplying cell;

a housing having a thickness smaller than 1.5 cm and housing therein said first and said second casings to form said battery card having a weight energy density larger than 40 watt-hours/kilograms and a volume energy density larger than 100 watt-hours/liter;

two contacts mounted on said housing and respectively electrically connected to said first and said second power-supplying cells for supplying power to said electrical apparatus through said two contacts; and a protection circuit for preventing said battery card from being overcharged and/or over discharged.

31. An electrical apparatus according to claim 30 wherein said housing is substantially a parallelepiped having a dimension smaller than 15 cm.

32. An electrical apparatus according to claim 30 wherein said first and second power-supplying cells are electrically connected in series.

33. An electrical apparatus according to claim 30 wherein:

said casing further includes a slot; and said electrical apparatus further includes a battery card assembly slidably inserted into said slot and having said card slit.

* * * * *